United States Patent [19]
Lindsay

[11] Patent Number: 6,050,575
[45] Date of Patent: Apr. 18, 2000

[54] RELATING TO CAMERA PEDESTALS

[75] Inventor: Richard Arthur Lindsay, Eye, United Kingdom

[73] Assignee: Vitec Group, PLC, Suffolk, United Kingdom

[21] Appl. No.: 09/101,785

[22] PCT Filed: Jan. 22, 1997

[86] PCT No.: PCT/GB97/00183

§ 371 Date: Jul. 16, 1998

§ 102(e) Date: Jul. 16, 1998

[87] PCT Pub. No.: WO97/27419

PCT Pub. Date: Jul. 31, 1997

[51] Int. Cl.$^7$ .................................................. F16M 11/42
[52] U.S. Cl. ................................. 280/47.11; 280/47.41; 280/870.21; 414/590
[58] Field of Search ........................ 280/47.11, 47.41, 280/47.34, 848, 87.01, 87.021, DIG. 1; 414/590; 243/183, 188.2

[56] References Cited

U.S. PATENT DOCUMENTS

| | | | |
|---|---|---|---|
| 2,661,672 | 12/1953 | Fairbanks | ............................. 280/47.11 |
| 3,087,630 | 4/1963 | Karrow et al. | ........................... 414/590 |
| 3,637,233 | 1/1972 | Hoppl . | |
| 4,095,250 | 6/1978 | Giglioli | .................................... 354/293 |
| 5,312,121 | 5/1994 | Chapman | ............................. 280/47.11 |
| 5,716,002 | 2/1998 | Lindsay | ................................ 280/47.11 |

FOREIGN PATENT DOCUMENTS

| | | |
|---|---|---|
| 983407 | 6/1951 | France . |
| 670899 | 7/1989 | Switzerland . |
| 1301548 | 12/1972 | United Kingdom . |

*Primary Examiner*—Richard M. Camby
*Attorney, Agent, or Firm*—Kenyon & Kenyon

[57] ABSTRACT

The disclosure relates to a camera pedestal comprising a rolling base (10), a vertically extending column (11) mounted on the base and having a camera mounting (12) at its upper end. The base comprises a chassis (16) having steerable wheel units (17) on which the chassis runs, a body (18) on which the column is mounted, screw-jack (25) supporting the body for vertical adjustment on the chassis, and a skirt (14) depending from the periphery of the body and encircling the chassis to sweep cables and other such obstructions from the path of the pedestal. The gap between the lower periphery of the skirt and the ground is minimised by adjustment of the body vertically with respect to the chassis by means of the screw-jacks.

8 Claims, 3 Drawing Sheets

RELATING TO CAMERA PEDESTALS

This invention relates to camera pedestals and is particularly, although not exclusively, intended for pedestals for supporting TV, video or cinematograph cameras.

Camera pedestals comprising a wheel mounted base supporting a column with a camera mounting at its upper end are well known for both studio and outside location work. The floor or ground over which the camera is to be moved invariably has power supply cables and other moveable obstructions laid on the floor and it is normal to provide the wheel units of the base or the base itself with cable guards to prevent the wheels from running over the cables/obstructions.

FR-A-983407 discloses a camera pedestal having a rolling base and a vertically extending column mounted on the base for supporting a camera at its upper end. The base has steerable wheel units with a cable mechanism linking the wheel unit to a steering arm for steering the base. The base has a depending skirt partially enclosing the wheel units. The skirt is such that there is a significant gap between the lower periphery of the skirt and the ground on which the wheel units run in which cables or other obstructions on the floor over which the base is moving can become trapped. No provision is made for adjusting the skirt.

This invention provides a camera pedestal comprising a rolling base, a vertically extending column mounted on the base and having a camera mounting at its upper end, the base comprising a chassis having steerable wheel units on which the chassis runs, a body on which the column is mounted, means to support the body for vertical adjustment on the chassis, and a skirt depending from the periphery of the body and encircling the chassis to sweep cables and other such obstructions from the path of the pedestal, the gap between the lower periphery of the skirt and the ground being minimised by adjustment of the body vertically with respect to the chassis.

Preferably the column is telescopic and is mounted on the body with its lower end projecting through the chassis into close proximity with the ground to provide a minimum height position for the camera mounting when the column is fully retracted.

More specifically the column may be mounted on the body with the lower end of the column generally flush with the lower level of the skirt so that adjusting the body height to set the skirt to a minimum clearance above the ground also sets the lower end of the column to a minimum clearance above the ground.

In any of the above arrangements the chassis and body may be generally triangular as viewed in plan, the chassis having steerable wheel units at the apices of the chassis and the vertically adjustable means comprising jacks between the body and chassis having a common drive mechanism for varying the extension of the jacks.

For example the jacks between the body and chassis may be screw-jacks, each having a rotatable adjustment member for extending/retracting the jack.

Preferably a steering mechanism for the wheel units is provided comprising a wheel encircling and rotatably mounted on the column and a transmission coupling the wheel to the steerable units on the chassis.

According to the further feature of the invention the steering transmission may be selectively coupleable either to the wheel units or to the jacks so that the wheel can be used either for steering the chassis or for adjusting the height of the base with respect of the chassis.

In an alternative arrangement a separate mechanism is provided for adjusting the jacks.

The following is a description of the specific embodiment of the invention, reference being made to the accompanying drawings in which.

Figure 1:
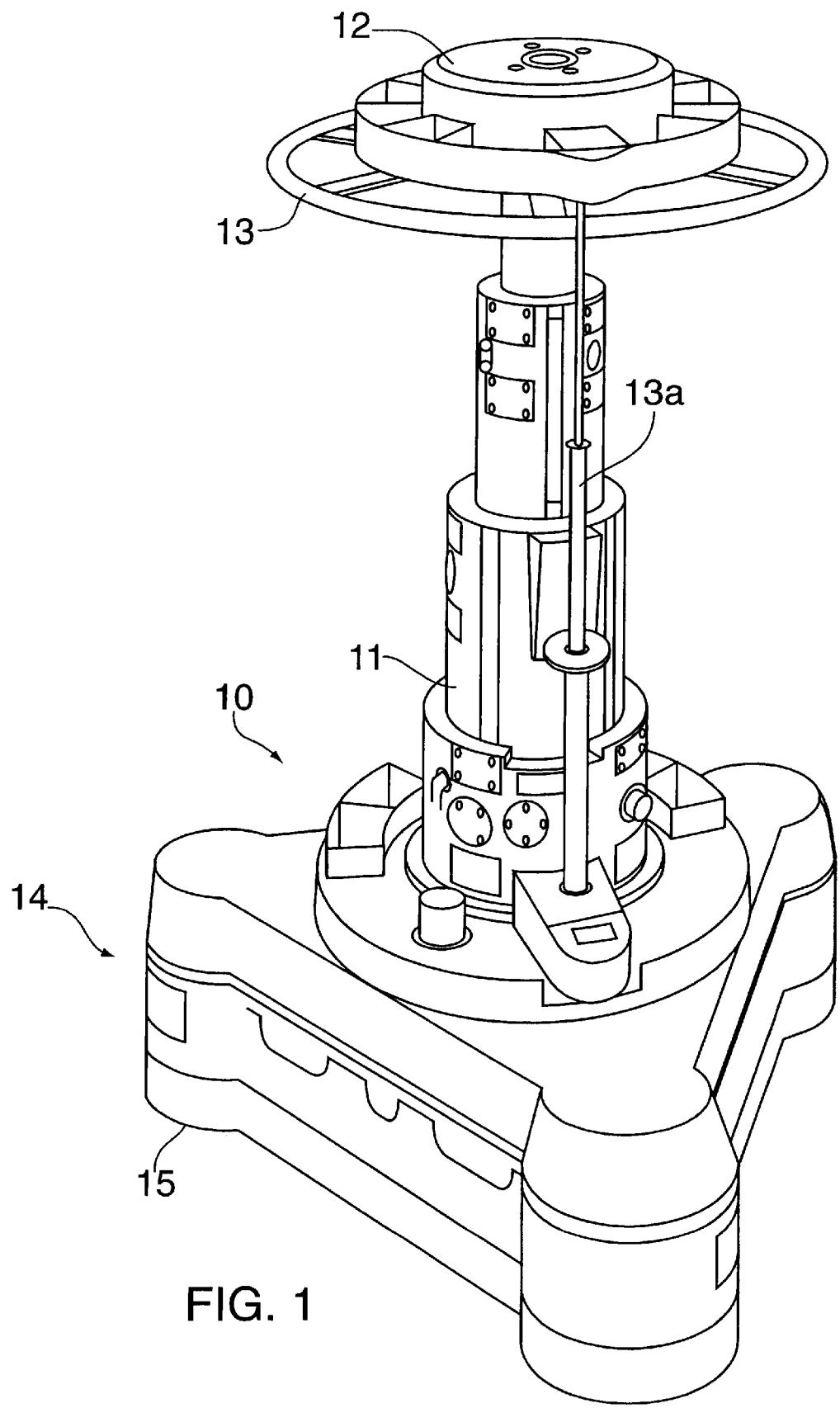
FIG. 1 is a perspective view of a known form of pedestal for supporting a film/video/TV camera comprising a wheel mounted triangular base and an upright extendable column having a carrier for the camera at its upper end.

Referring firstly to FIG. 1 of the drawings, there is shown a pedestal for supporting a TV, video or cinematograph camera comprising a base 10 of generally equilateral triangular form having a vertically extendable column 11 mounted at the centre of the base with a circular plate 12 at the upper end of the column to receive a pan and tilthead camera mounting. The lower end of the column projects downwardly through the base to stop short of the ground. This enables the column to be retracted to a low level when required.

The base 10 is supported on steerable wheel units (not shown) at the three apices of the base. The wheel units are steered by a steering wheel 13 mounted at the upper end of the extendable column which turns through a gear mechanism (not shown) a vertically extending steering column 13a mounted parallel with and to one side of the camera support column. The lower end of the column 13a is coupled via a drive chain mechanism (not shown) to the steerable wheel units. The steering mechanism can be selectively operated in conventional or crab steering modes.

The lower periphery of the base 10 has an encircling skirt 14 secured to the base with its lower periphery 15 set close to the floor. The skirt is intended to sweep cables lying over the studio floor out of the path of the pedestal as it moves over the studio floor so that the pedestal does not run over them. The skirt is formed in three sections which are mounted for vertical adjustment on the three respective sides of the base.

The finish of studio floors varies substantially from studio to studio between very smooth flat surfaces and undulating rough services. The height of the skirt section is fixed to accommodate the undulations and surface bumps which the pedestal is likely to encounter which may mean that the skirt is set higher than an ideal level which would ensure that it does not run over cables laid over the studio floor. Furthermore the column is fixed to the base so that the minimum height of the camera mounting is fixed.

Figure 2:
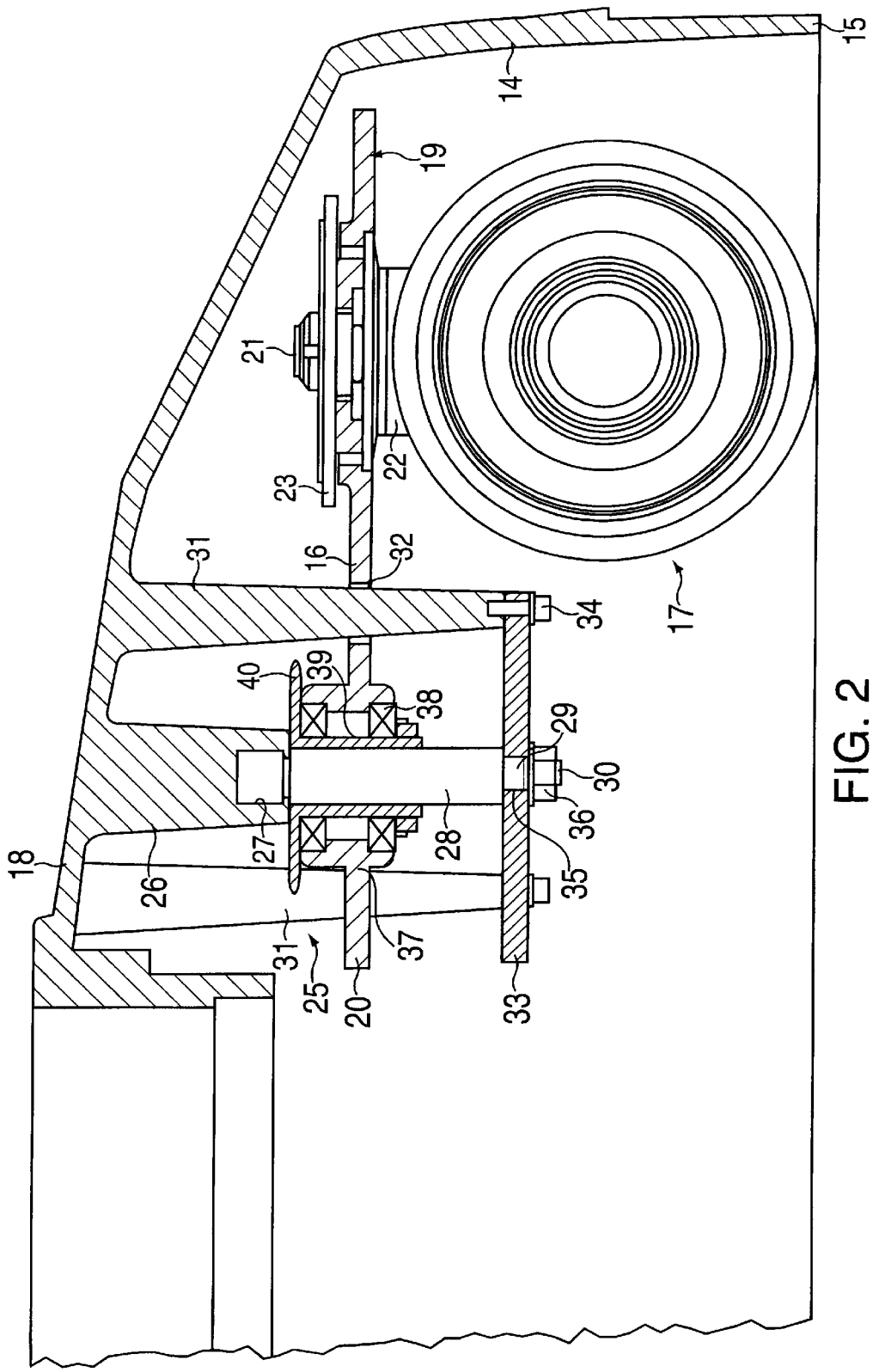
FIG. 2 is a sectional view through a corner of the base of a pedestal in accordance with the invention and having a chassis supported on the steerable wheel unit and a body supported on an adjustable screw-jack on the chassis.
Figure 3:
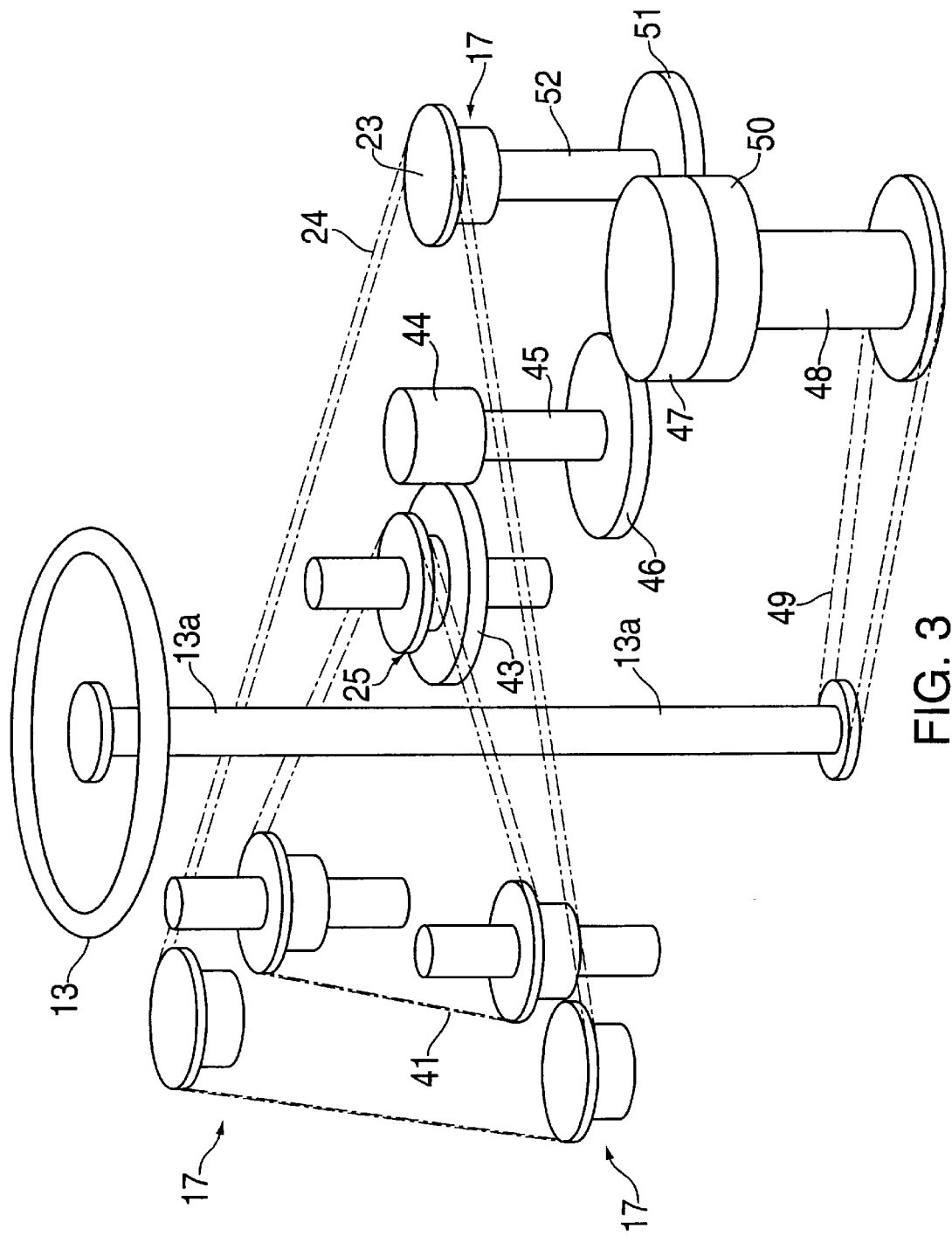
FIG. 3 shows a mechanism for selectively steering the wheel units of the pedestal and operating the screw-jacks between the body and chassis.

Reference is now made to FIGS. 2 and 3 of the drawings which show an embodiment of the present invention intended to overcome the above difficulties. More specifically, the base of the pedestal comprises a chassis 16 on which the aforesaid steerable wheel units, one of which is indicated as 17, are mounted and a separate body 18 on which the column 11 is mounted and which is provided with the peripheral skirt 14.

The chassis 16 is in the form of a generally triangular plate 16 having apices, one of which is indicated at 19 where the wheel units 17 are mounted. The chassis has a central opening 20 through which the lowermost part of the column 11 extends into close proximity with the ground. This enables the column to be retracted to a correspondingly low level.

Each wheel units includes a vertically extending steering shaft 21 mounted in bearings (not shown) in a hub 22 which is secured in a socket in the underside of the chassis 19. The shaft projects through the chassis and a toothed wheel 23 is secured to the upper end of the shaft with which a steer drive chain 24 which extends around the periphery of the chassis engages to turn the steering units together.

The body 18 of the pedestal supported on the chassis 16 by means of three screw-jacks indicated at 25 adjacent to and inwardly of the respective wheel units 17. The underside of the body has a downwardly projecting integral boss 26 formed with a bore 27 in which the upper end of a screw threaded stud 28 is mounted. The lower end of the stud 28 has a reduced diameter shank 29 which is partly screw threaded, as indicated at 30. Webs 31 extend downwardly from the underside of the body and pass with clearance through apertures 32 in the chassis. A plate 33 is secured by bolts 34 to the bottom ends of the webs and the shank 29 of the screw-jack stud is secured in an aperture 35 in the plate by a nut 36. Thus the upper end of the screw-jack stud is held in the boss 26 and the lower end of the stud is braced by the plate.

The chassis 16 is formed with an integral hub 37 through which the screw-jack 28 extends. Upper and lower bearings 38 are mounted in the hub 37 and a hollow internally screw threaded shaft in which the screw jack stud 28 engages is supported in the bearings. The shaft 39 has an integral chain sprocket 40 at its upper end for rotating the shaft with respect to the screw-jack stud and thereby raising and lowering the stud 28 and with it the body 18 of the pedestal with respect to the chassis.

Again referring to FIG. 3 of the drawings, the three sprockets 40 of the respective screw-jacks are engaged by a drive chain 41 so that movement of the drive chain in one or other direction rotates the sprockets 40 to adjust the screw-jacks and thereby raise and lower the body with respect to the chassis as described below.

The shaft 39 of one of the screw-jacks 25 is also formed with an integral gear wheel 43 which meshes with a gear 44 at one end of a parallel shaft 45 mounted on the chassis the other end of which carries a further gear 46. The gear 46 is in permanent mesh with a gear 47 on a further chassis mounted shaft 48 which is coupled by a chain sprocket drive 49 with the steering column 14. A second gear 50 is mounted on a further chassis mounted shaft 48 and meshes with a gear 51 on an extension 52 on one of the shafts 21 of a wheel unit 17. The gears 47 and 50 are selectively and alternately coupleable by clutch mechanisms (not shown) to the shaft 48 so that rotation of the steering wheel 13 can be used to steer the wheel units 17 on the base with gear 50 locked to shaft 48 or adjust the screw-jacks with gear 47 locked to shaft 48.

Thus the steering wheel 13 can be used to adjust the screw-jacks and thereby raise and lower the body of the base with respect to the chassis. In FIG. 2, the body is shown in its lower most position with the lower end of the boss 26 in engagement with the top of the sprocket 40 and the lower periphery 15 of the skirt 14 in very close proximity or against the floor. The column is mounted on the base with its lower end lying generally flush with the lower periphery of the skirt so that setting the position of the skirt to a minimum clearance position also sets the lower end of the column to a minimum clearance position. The height of the body is adjusted according to the floor with the bottom periphery of the skirt set as low as possible but with sufficient clearance to avoid contact with a floor which is rough or has an undulating surface. Thus the arrangement enables the skirt and the lower end of the column to be set as low as possible to ensure clearance of wiring laid over the floor in the path of the pedestal whilst avoiding direct contact of the skirt and the column with the floor.

I claim:

1. A camera pedestal comprising a rolling base, a vertically extending column mounted on the base and having a camera mounting at its upper end, the base comprising a chassis having steerable wheel units on which the chassis runs, a body on which the column is mounted, vertically adjustable means coupled to the body and the chassis for varying the vertical position of the body relative to the chassis, and a skirt depending from a periphery of the body and encircling the chassis, the vertically adjustable means being operable to minimize a gap between a lower edge of the skirt and a surface on which the steerable wheel units are supported.

2. A camera pedestal as claimed in claim 1, wherein the column is telescopic and is mounted on the body with a lower end of the column projecting through the chassis into close proximity with the surface on which the steerable wheel units are supported to provide a minimum height position for the camera mounting when the camera is fully retracted.

3. A camera pedestal as claimed in claim 2, wherein the column is mounted on the body with the lower end of the column generally flush with the lower edge of the skirt so that adjusting the body height to minimize the gap between the skirt and the surface on which the steerable wheel units are supported also sets the lower end of the column to a minimum clearance above the surface on which the steerable wheel units are supported.

4. A camera pedestal as claimed in claim 1, wherein the chassis and body of the base are generally triangular and wherein the steerable wheel units are mounted at apices of the chassis, the vertically adjustable means comprising a plurality of jacks mounted between the body and the chassis, the jacks having a common drive mechanism for varying an extension of the jacks.

5. A camera pedestal as claimed in claim 4, characterised in that the jacks between the body and chassis are screw-jacks, each having a rotatable adjustment member (39) for extending/retracting the jack.

6. A camera pedestal as claimed in claim 4, characterised in that the steering mechanism for the wheel units comprise a wheel (13) encircling and rotatably mounted on the column (11) and a steering transmission (49) coupling the wheel to the steerable units (17) on the chassis (16).

7. A camera pedestal as claimed in claim 6, wherein the steering transmission is selectively coupleable to the wheel units and the jacks so that, in a first mode of operation, operation of the wheel steers the chassis and, in a second mode of operation, operation of the wheel adjusts the height of the body with respect of the chassis.

8. A camera pedestal as claimed in claim 6, wherein the vertically adjustable mechanism is separate from the wheel.

* * * * *